United States Patent [19]

Olins

[11] Patent Number: 4,529,351
[45] Date of Patent: Jul. 16, 1985

[54] LOCKING TAIL-GATE ASSEMBLY
[75] Inventor: Richard C. Olins, Toronto, Canada
[73] Assignee: Diesel Equipment Limited, Toronto, Canada
[21] Appl. No.: 588,552
[22] Filed: Mar. 12, 1984
[30] Foreign Application Priority Data
Mar. 24, 1983 [CA] Canada ................................. 424331
[51] Int. Cl.³ ............................................... B60P 1/46
[52] U.S. Cl. ..................................... 414/545; 292/31; 296/57 R
[58] Field of Search ................. 414/545, 557; 296/56, 296/57 R; 292/31, 54

[56] References Cited
U.S. PATENT DOCUMENTS 896,171 8/1908 Turner ................................. 292/31
3,275,170 9/1966 MacRae et al. ............... 296/57 R X Primary Examiner—Robert G. Sheridan
Attorney, Agent, or Firm—Fetherstonhaugh & Co.

[57] ABSTRACT

A tail-gate assembly comprises a stationary support, a slide mounted on the stationary support, a platform pivotally mounted on the slide, a latch member mounted on and projecting laterally from said loading platform, a latch plate mounted on said stationary support. The latch plate has a latch notch formed therein which has an entrance way opening in a direction to admit the latching member. The notch is proportioned to receive said latch member in a close fitting relationship so as to provide a vertical restraint limiting vertical movement and a rotational restraint limiting rotational movement of said platform. A pair of latching jaws each having a locking tooth at one end thereof, are mounted on the latch plate for pivotal movement between a closed position in which the locking teeth extend inwardly from opposite sides of said entrance way to prevent withdrawal of the latching member from said notch and an open position in which the teeth are displaced outwardly from said entrance way to admit and release the latching member. A closure spring normally urges the jaws toward the closed position, the closure spring is adapted to yield to permit the jaws to open in response to contact with the latch member as it is moved into engagement therewith. An actuator is provided on the jaws which is adapted to cause the jaws to interact with one another whereby movement of one jaw toward the open position causes movement of the other jaw toward the open position.

2 Claims, 3 Drawing Figures

U.S. Patent    Jul. 16, 1985    4,529,351
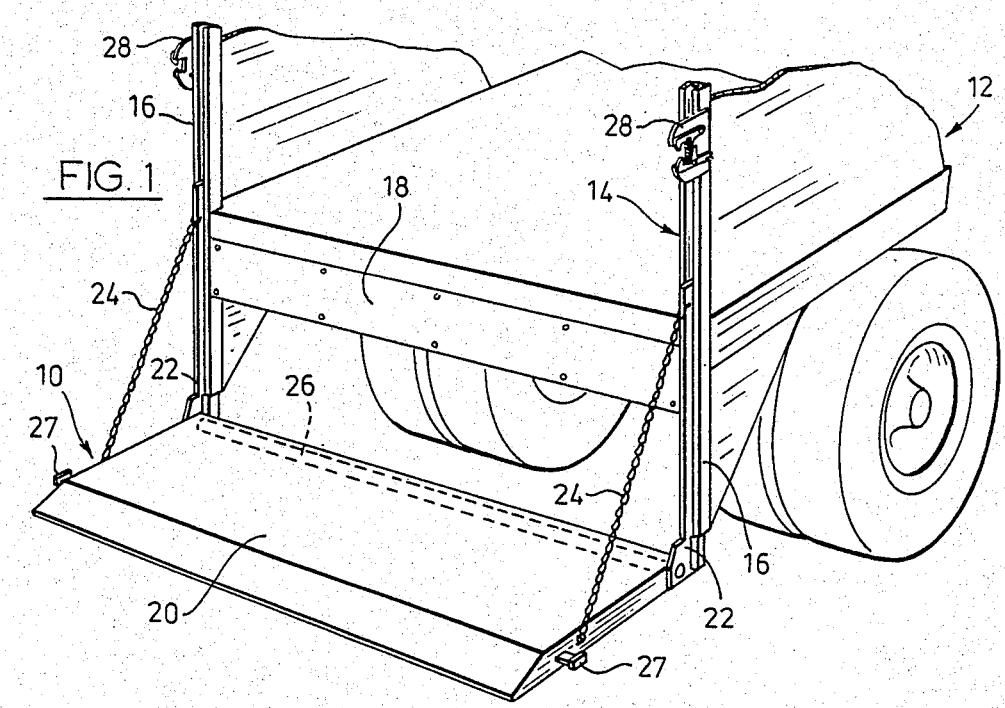
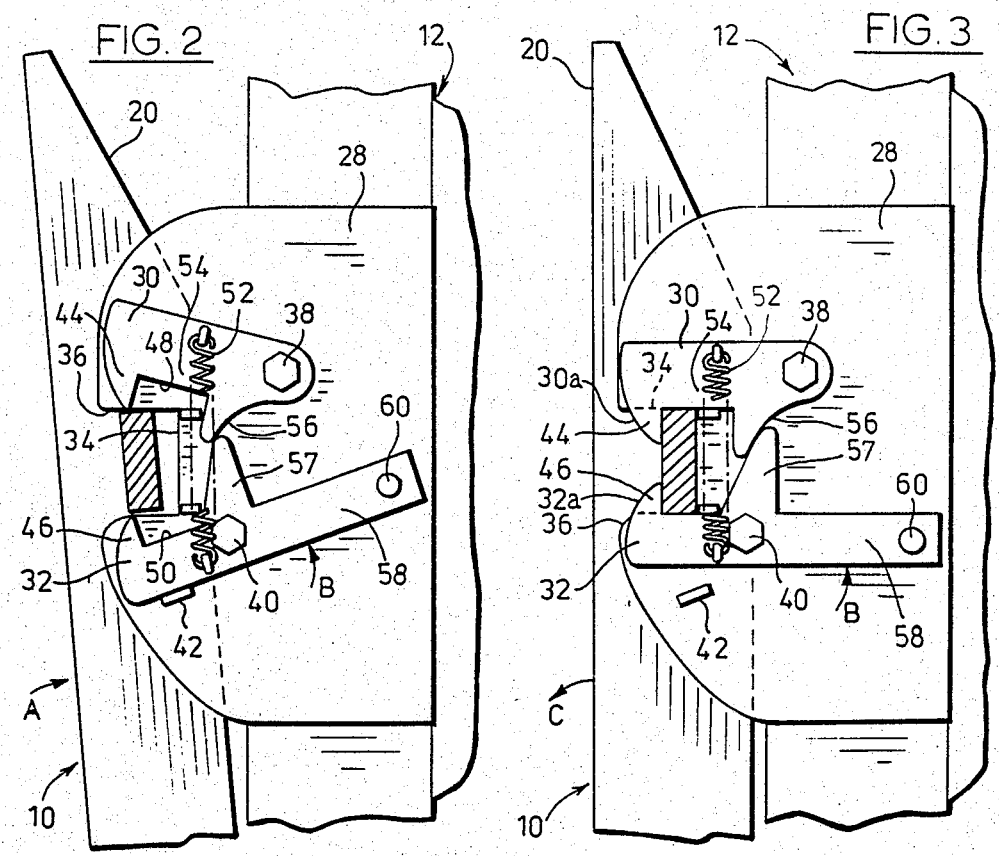

LOCKING TAIL-GATE ASSEMBLY

This invention relates to tail-gate assemblies. In particular, this invention relates to a tail-gate lift assembly which includes a locking mechanism for locking the tail-gate in an upright position.

PRIOR ART

Our tail-gate lifts are commonly used for raising and lowering loads with respect to truck bodies on which they are mounted. In these known devices, the tail-gate can be moved between an upright position and a horizontal position so as to function as a normal tail-gate and when in the horizontal position, it can be raised and lowered to provide a loading platform.

One such power-operated tail-gate is described in Canadian Pat. No. 944,319 dated Mar. 26, 1974 issued to Diesel Equipment Limited. This mechanism also includes a latching mechanism for retaining the tail-gate in an upright position. The latching mechanism is, however, one in which it is necessary to raise the platform above the latching plate and to lower the latch into the notch provided in the latching plate.

The tail-gate assembly of the present invention permits automatic locking of the tail-gate in the upright position when the tail-gate is in its raised position and is pivoted to its upright position.

One of the problems encountered with the conventional lift tail-gate assemblies is that when the tail-gate is in its upright storage position, it is free to bounce up and down and this can cause the latching mechanism to be released and may also cause excessive wear and tear in use since the lifting and hydraulic mechanism is subjected to the strain caused by road shocks and vibration. Various devices such as pins and rest hooks have been tried in an attempt to overcome this problem. These devices are either complex and prone to breakdown or are simple but require operator action and are therefor often not used or, although simple, permit bouncing of the platform as ocurrs when rest hooks are used.

With my mechanism it is possible to releive the hydraulic pressure in the mechanism, prevent bouncing and obtain automatic operation without operator intervention when closing the tailgate.

I have found that this difficulty can be overcome by incorporating a stationary restraint in the latching mechanism which serves to restrict the vertical movement of the tail-gate when in the upright position.

According to one aspect of the present invention, a tail-gate assembly comprises a stationary support, slide means slidably mounted on said stationary support for movement between a raised position and a lowered position, a platform pivotally mounted on said slide means for movement in a first direction between a horizontal position and an upright position and movement in a second direction between the upright position and the horizontal position, platform pivoting means normally urging said platform in said first direction towards said upright position, a latch member mounted on and projecting laterally from said loading platform, a latch plate mounted on said stationary support, said latch plate having a latch notch formed therein which has an entrance way opening in a direction opposite said first direction to admit said latching member to said notch, said notch being proportioned to receive said latch member in a close fitting relationship so as to provide a vertical restraint limiting vertical movement and a rotational restraint limiting rotational movement of said platform, a pair of latching jaws each having a locking tooth at one end thereof, said jaws being mounted on said latch plate for pivotal movement between a closed position in which the locking teeth extend inwardly from opposite sides of said entrance way to prevent withdrawal of the latching member from said notch and an open position in which the teeth are displaced outwardly from said entrance way to admit and release the latching member, closure means engaging said jaws and normally urging said jaws towards said closed position, said closure means being adapted to yield to permit said jaws to open in response to contact with the latch member as it is moved in said first direction under the influence of said platform pivoting means, actuator means on said jaws adapted to interact with one another whereby movement of one jaw toward the open position causes movement of the other jaw toward the open position.

The invention will be more clearly understood after reference to the following detailed specification read in conjunction with the drawings wherein;

FIG. 1 is a pictorial view of a tail-gate assembly constructed in accordance with an embodiment of the present invention.

FIG. 2 is a side view of a portion of the tail-gate and latch mechanism showing the latch mechanism in an open position.

FIG. 3 is a side view similar to FIG. 2 showing the latching mechanism in a closed position.

With reference to FIG. 1 of the drawings, reference numeral 10 refers generally to an elevator platform assembly, the reference numeral 12 refers generally to the body of a truck on which a stationary support generally identified by the reference numeral 14 is mounted.

The elevator assembly 10 comprises a member 20 which constitutes a loading platform when in the horizontal position shown in FIG. 1 and a tailgate when in the vertically oriented position shown in FIGS. 2 and 3. The platform 20 is pivotally mounted on slides 22 which are slidably mounted in tracks formed in the stationary support rails 16. A chain 24 serves to connect the member 20 to the slides 22 to retain the member 20 in its horizontal platform position.

The hydraulic hoist mechanism required for raising and lowering the platform is housed within the compartment formed inwardly of the transverse beam 18. The elevator mechanism may be any conventional mechanism used in this form of device which may include the hydraulic ram and various chain drives such as that described in Canadian Pat. No. 944,319.

The platform 20 preferably incorporates torsion bars 26 which serve to normally urge the platform 20 to the upright position. Torsion bars of this type are well known and have been used for some considerable time and not therefore described in detail. The torque applied by the torsion bars is not sufficient to lift the platform from the horizontal position shown in FIG. 1 to the upright position, although it is sufficient to cause the Platform to move to the upright position after the platform has been raised to about a 60 degree incline to the horizontal plane.

In order to retain the member 20 in the upright tailgate position, I provide a latching mechanism which comprises a latch member 27, a latch plate 28 and a pair of latching jaws 30 and 32. The latch member 27 is in the form of a bracket which projects laterally from a side edge of the tail-gate 20.

The latch plate 28 is formed with a U-shaped notch 34, the entrance way 36 of which opens, in a direction opposite to the direction in which the tail-gate 20 moves when pivoting from its horizontal position to its upright position.

The notch 34 is proportioned to receive the latch member 27 in a close fitting relationship with sufficient clearance to facilitate the entry and removal of the latch member. The inner edge of the notch forms a back stop which serves to limit movement of the platform in the direction of the arrow A and thereby forms a rotational restraint. The upper and lower edges of the notch 34 form vertical restraints limiting vertical movement of the latch member 27.

The latching jaws 30 and 32 are pivotally mounted on the latch plate 28 by means of pivot pins 38 and 40. A stop bracket 42 is mounted on the latch plate 28 and serves to bear against an edge of the jaw 32 to limit the extent of the opening movement of the jaw 32 to that sufficient to clear the notch 34. The jaws 30 and 32 have a locking tooth 44 and 46 at their outer ends respectively. A locking notch 48 and 50 is formed inwardly from the locking tooth 44 and 46 respectively. The notches 48 and 50 are arranged to be aligned with the notch 34 when the jaws are in the closed position and the teeth 44 and 46 are proportioned to project across the entrance way 36 to retain the latch member 27 inwardly of the notch as shown in FIG. 3 of the drawings wherein the jaws are in the closed position.

A tension spring 52 has its opposite ends secured to the jaws 30 and 32 so as to normally urge the jaws to the closed position shown in FIG. 3.

The jaw 30 has a first length 54 extending radially from the pivot pin 36 upon which a cam face 56 is formed. The cam face 56 is inclined forwardly and inwardly toward the other jaw 32. An arm 57 is formed on the jaw 32 and projects outwardly therefrom toward the jaw 30. The jaw 32 also has an extension 58 upon which a manually engageable handle 60 is mounted.

In use, in order to open the jaws 30 and 32, the manually engageable handle 60 is engaged and the jaw 32 is pivoted about its pivot pin 40 in the direction of the arrow B. This action causes the arm 57 to engage the cam face 56 which deflects the jaw 30 outwardly. Outward deflection of the jaw 30 is limited by contact with the stop 42.

It will be understood that the jaws assume the open position shown in FIG. 2 when manually opened as described above. If the opening force is removed, the jaws will close under the influence of the tension spring 52.

The outer ends 30A and 32A of the jaws 30 and 32 respectively, are rounded such that when the jaws are closed and the tail-gate pivots to its upright position, the force applied to the jaws by the latch member 27 when it makes contact with the jaws, will spread the jaws apart to permit the latch member 27 to enter the notch 34. The closing forces applied by the conventional torsion bars are sufficient to ensure that the tail-gate will move to the latched position with the result that it will not be necessary to manually open the latch jaws in order to latch the tail-gate in the upright position.

In order to release the latching mechanism, it is merely necessary to engage the handle 60 to rotate the jaw 32 about its pivot 40 in the direction of the Arrow B. This serves to open the jaws as previously described, so that the tail-gate 20 can be pivoted in the direction of the Arrow C to its horizontal position.

From the foregoing it will be apparent that the latch plate 28 provides fixed vertical and rotational restraints on three sides of the latch member 27 and the teeth 44 and 46 of the jaws 30 and 32 provide a further restraint outwardly overlying the latch member 27 to prevent removal of the latch member. With this latch construction, the entire weight of the platform may be supported by the latch mechanism.

Various modifications of the present invention will be apparent to those skilled in the art. For example, a latch mechanism of the type described above may be provided on each support rail 16. Furthermore, it will be apparent that the latch plate may be secured to any stationary component. It will also be apparent that the latch plate can be positioned at any height so as to retain the tail-gate at any required height. A latch mechanism may be provided on the support rail 16 at a level to store the tail-gate in a folded configuration at any required height.

By constructing the latch mechanism so that it employs two jaw members rather than one jaw, it is possible to form the latching slots which are formed in the jaws to a closer manufacturing tolerance. Because two jaws are used, it is only necessary to displace each jaw along its pivoting arc a distance which is half that which would be required for a single jaw. Thus, the clearance required in order to permit the latching notches of the jaws to embrace a generally rectangular latch member can be relatively small. I have found that using two jaws provides a more reliable latching interlock than can be obtained with a single jaw and furthermore, the use of the two jaws permits closer tolerances to be maintained as previously described with the result that the latching member can be more closely embraced thereby minimizing the freedom of movement of the latching member with respect to the latch assembly in use. This serves to minimize wear and tear as previously indicated.

The embodiments of the invention in which an exclusive property or privilege is claimed are defined as follows:

1. A tail-gate assembly comprising;
   (a) a stationary support,
   (b) slide means slidably mounted on said stationary support for movement between a raised position and a lowered position,
   (c) a platform pivotally mounted on said slide means for movement in a first direction between a horizontal position and an upright position and movement in a second direction between the upright position and the horizontal position,
   (d) platform pivoting means normally urging said platform in said first direction towards said upright position,
   (e) a latch member mounted on and projecting laterally from said loading platform,
   (f) a latch plate mounted on said stationary support, said latch plate having a latch notch formed therein which has an entrance way opening in a direction opposite said first direction to admit said latching member to said notch, said notch being proportioned to receive said latch member in a close fitting relationship so as to provide a vertical restraint limiting vertical movement and a rotational restraint limiting rotational movement of said platform, (g) a pair of latching jaws each having a locking tooth at one end thereof, said jaws being mounted on said latch plate for pivotal movement between a closed position in which the locking teeth extend inwardly from opposite sides of said entrance way to prevent withdrawal of the latching member from said notch and an open position in which the teeth are displaced outwardly from said entrance way to admit and release the latching member, (h) closure means engaging said jaws and normally urging said jaws towards said closed position, said closure means being adapted to yield to permit said jaws to open in response to contact with the latch member as it is moved in said first direction under the influence of said platform pivoting means, (i) actuator means on said jaws adapted to interact with one another whereby movement of one jaw toward the open position causes movement of the other jaw toward the open position.

2. A tail-gate assembly as claimed in claim 1 wherein first of said jaws has a first length extending from its pivot mounting to its associated tooth, said first length having a cam face disposed opposite the second of said jaws, said cam face being inclined forwardly from the first pivot mounting to the first jaw in a direction toward said second jaw, said second jaw having an arm projecting toward said first jaw and bearing against said cam face, said arm being moveable along said cam face in response to rotation of said second jaw toward its open position to move said first jaw to its open position thereby to open said jaws.

* * * * *